United States Patent
Feliss et al.

(10) Patent No.: US 7,446,973 B2
(45) Date of Patent: Nov. 4, 2008

(54) DISK AND CLAMP ASSEMBLY

(75) Inventors: Norbert A. Feliss, Sunnyvale, CA (US);
Donald Ray Gillis, San Jose, CA (US);
Reinhard F. Wolter, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 685 days.

(21) Appl. No.: 10/741,232

(22) Filed: Dec. 19, 2003

(65) Prior Publication Data
US 2005/0135225 A1    Jun. 23, 2005

(51) Int. Cl.
*G11B 17/02*    (2006.01)

(52) U.S. Cl. .................................. 360/99.12

(58) Field of Classification Search ............. 360/99.12, 360/99.05, 98.08
See application file for complete search history.

(56) References Cited

U.S. PATENT DOCUMENTS

| | | | | |
|---|---|---|---|---|
| 3,947,893 A | * | 3/1976 | Hall, Sr. ..................... | 360/133 |
| 4,864,443 A | * | 9/1989 | Peterson .................. | 360/99.12 |
| 4,945,432 A | * | 7/1990 | Matsudaira et al. ...... | 360/98.02 |
| 5,072,438 A | * | 12/1991 | Suzuki et al. ............... | 720/724 |
| 5,243,481 A | * | 9/1993 | Dunckley et al. ........ | 360/99.08 |
| 5,267,106 A | * | 11/1993 | Brue et al. ............... | 360/98.08 |
| 5,317,225 A | * | 5/1994 | Miyaji et al. ............. | 310/67 R |
| 5,550,690 A | * | 8/1996 | Boutaghou et al. ........ | 360/99.12 |
| 5,596,462 A | * | 1/1997 | Smith ....................... | 360/99.12 |
| 5,600,512 A | * | 2/1997 | Radwam et al. .......... | 360/98.08 |
| 5,760,999 A | * | 6/1998 | Yahata ..................... | 360/98.01 |
| 5,790,345 A | * | 8/1998 | Alt ........................... | 360/98.08 |
| 5,875,171 A | * | 2/1999 | Albrecht et al. ............ | 369/281 |
| 6,002,663 A | * | 12/1999 | Sandstrom .................. | 369/282 |
| 6,172,844 B1 | * | 1/2001 | Luo et al. ................. | 360/98.08 |
| 6,172,852 B1 | * | 1/2001 | Boutaghou et al. ........ | 360/244.5 |
| 6,195,234 B1 | * | 2/2001 | Sundaram et al. ........... | 360/135 |
| 6,381,092 B1 | | 4/2002 | Suzuki ..................... | 360/98.08 |
| 6,414,817 B1 | * | 7/2002 | Luo et al. ................. | 360/98.08 |
| 6,563,668 B1 | | 5/2003 | Suwito ..................... | 360/98.08 |
| 6,850,389 B2 | * | 2/2005 | Drake et al. ............. | 360/99.12 |
| 6,888,698 B1 | * | 5/2005 | Berding et al. ........... | 360/98.08 |
| 2002/0071205 A1 | | 6/2002 | Koyanagi et al. ......... | 360/98.08 |

FOREIGN PATENT DOCUMENTS

JP    03162785    *    7/1991

\* cited by examiner

*Primary Examiner*—Angel A Castro
(74) *Attorney, Agent, or Firm*—Zilka-Kotab, PC

(57) ABSTRACT

A clamp includes a disk and a clamp engaging the disk, wherein the clamp has protrusions that bite into a surface of the disk. A disk and clamp assembly includes a disk having receiving areas formed therein, and a clamp engaging the disk, where the clamp has protrusions that engage the receiving areas. Another disk and clamp assembly includes a disk having protrusions formed thereon, and a clamp engaging the disk, where the clamp has receiving areas adapted for receiving the protrusions.

21 Claims, 7 Drawing Sheets

DISK AND CLAMP ASSEMBLY

FIELD OF THE INVENTION

The present invention relates to disk drive components, and more particularly, this invention relates to a disk and clamp assembly.

BACKGROUND OF THE INVENTION

A typical disk drive storage system includes one or more magnetic disks which are mounted for co-rotation on a hub or spindle. A typical disk drive also includes a transducer supported by a hydrodynamic bearing which flies above each magnetic disk. The transducer and the hydrodynamic bearing are sometimes collectively referred to as a data head or a product head. A drive controller is conventionally used for controlling the disk drive based on commands received from a host system. The drive controller controls the disk drive to retrieve information from the magnetic disks and to store information on the magnetic disks. An electromechanical actuator operates within a negative feedback, closed-loop servo system to move the data head radially or linearly over the disk surface for track seek operations and holds the transducer directly above a desired track or cylinder on the disk surface for track following operations.

Typically the magnetic disks 2 also comprise servo sectors 18 which are recorded at a regular interval and interleaved with the data sectors 12, as shown in FIG. 1. A servo sector, as shown in FIG. 2, typically comprises a preamble 20 and sync mark 22 for synchronizing to the servo sector; a servo data field 24 comprising coarse position information, such as a Gray coded track address, used to determine the radial location of the head with respect to the plurality of tracks; and a plurality of servo bursts 26 recorded at precise intervals and offsets from the track centerlines which provide fine head position information. When writing or reading data, a servo controller performs a "seek" operation to position the head over a desired track; as the head traverses radially over the recording surface, the Gray coded track addresses in the servo data field 24 provide coarse position information for the head with respect to the current and target track. When the head reaches the target track, the servo controller performs a tracking operation wherein the servo bursts 26 provide fine position information used to maintain the head over the centerline of the track as the digital data is being written to or read from the recording surface.

To ensure that the head remains properly aligned with the data tracks, the disks must be securely attached to the spindle. Current practice is to separate the disks in the stack with spacer rings, and position a spacer ring on top of the disk/spacer stack. Then a top ring, called a clamp, with several apertures is placed over the top spacer ring. The disks are bolted to the spindle via bolts extending through the apertures in the top clamp. Great pressure must be exerted by the bolts on the top clamp in order to prevent slippage of the disks in the event that the drive is bumped or uneven thermal expansion that breaks the frictional coupling, because once the disks slip, the drive loses its servo and the data is lost.

Disks are typically formed from aluminum or glass. Aluminum is more easily deformed, so any external stress can cause deformations to the disk. Glass, too, will deform under uneven stress patterns.

A major drawback of the current practice is that when the bolts are tightened, the top clamp and spacer become deformed due to the uneven pressures exerted by the individual bolts. The deformation translates out to the disk, creating an uneven "wavy" disk surface, which is most prominent at the inner diameter of the disk. Any unevenness (waviness) on the disk surface compounds the tendency to lose the servo, especially near the inner diameter zone closest to the spacer ring.

Further, it has been found that stresses induced on the top disk in the stack transfer down and propagate into some or all of the remaining disks in the stack. Thus, it would be desirable to reduce uneven stresses at the top disk so that the remaining disks remain flat.

Another issue encountered in the prior art is the high cost of assembling the drives. Each spacer must be placed in the drive and then the top clamp added and bolted down. This process is time consuming. To reduce assembly costs, it would be desirable to couple the top clamp and top spacer ring together so that they can be placed in the drive at the same time. This would save a processing step in that only one piece (top clamp-spacer composite) need be handled instead of two parts (top clamp and spacer ring individually).

The cost savings obtainable by using a composite structure would be increased in new high capacity drives which require only a few disks as opposed to several. For example, in a drive with five disks, five parts must be handled: the top clamp-spacer composite and four more spacer rings. In a drive with only two disks, only two parts are handled: the top clamp-spacer composite and one spacer.

Additional cost savings would be realized during manufacture of the top clamp and top spacer ring themselves, as it would no longer be necessary to machine two surfaces in such a way to match flatness.

SUMMARY OF THE INVENTION

A clamp includes a disk and a clamp engaging the disk, wherein the clamp has protrusions that bite into a surface of the disk. A disk and clamp assembly includes a disk having receiving areas formed therein, and a clamp engaging the disk, where the clamp has protrusions that engage the receiving areas. Another disk and clamp assembly includes a disk having protrusions formed thereon, and a clamp engaging the disk, where the clamp has receiving areas adapted for receiving the protrusions.

A spacer may also be added to the assembly. The spacer may have protrusions adapted to bite into a surface of the disk. The spacer may also have protrusions that engage receiving areas of the disk.

The protrusions of the disk, clamp, and/or spacer can be organized in a generally annular fashion, in a random fashion, etc. The protrusions may be formed in varying shapes. For example, the protrusions can have a tapered points, generally rectangular cross sections, can taper apart towards free ends thereof, can have bulbous portions towards free ends thereof, and combinations of these.

Preferably, the clamp has a stiffness at least as stiff as a primary material of the disk. In those assemblies with mating protrusions/receiving areas, an adhesive is positioned in the receiving areas.

Any of these embodiments can be integrated into a magnetic storage system.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
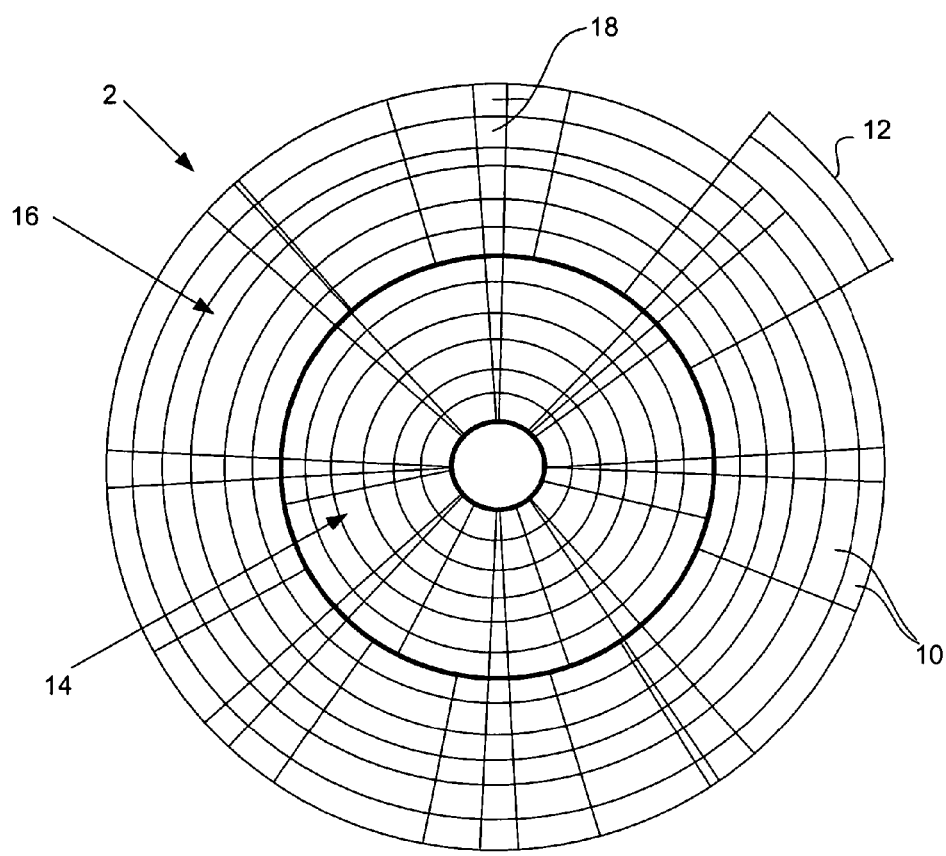
FIG. 1 shows a typical format for of a disk surface comprising a plurality of radially spaced, concentric data tracks partitioned into a number of data sectors and embedded servo sectors for positioning the heads over the disk surfaces while seeking and tracking.
Figure 2:
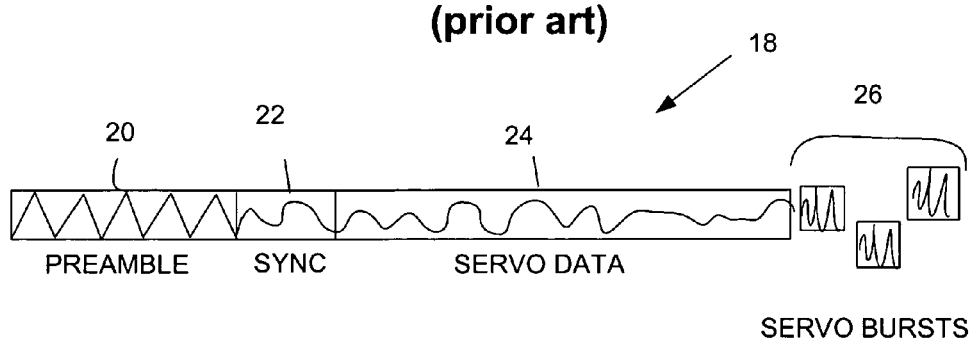
FIG. 2 shows a typical format of an embedded servo sector.
Figure 3:
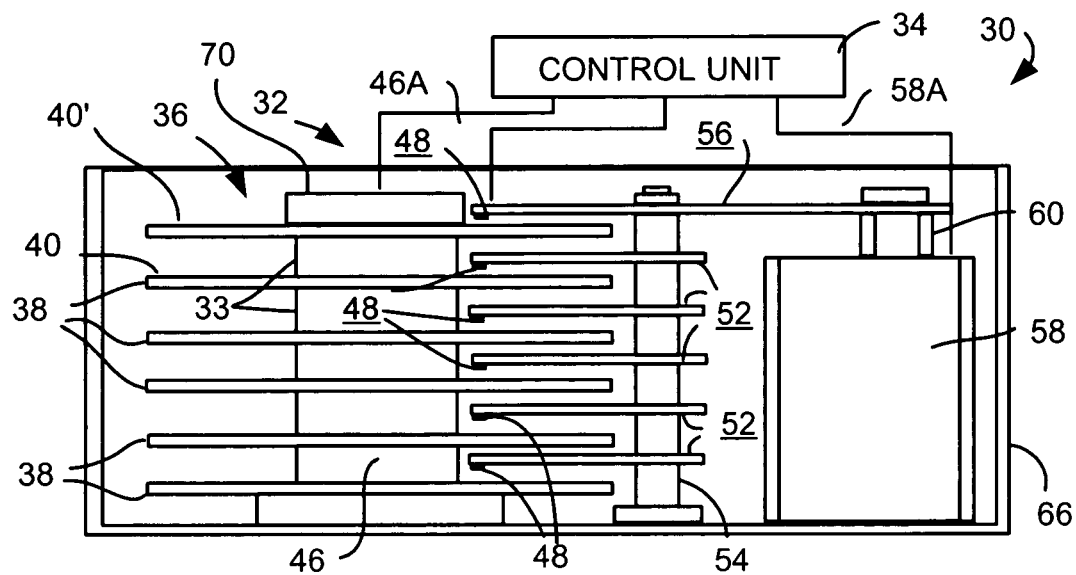
FIG. 3 is a schematic and simplified vertical sectional view of a rigid magnetic disk drive unit embodying the present invention.

Referring now to the drawings wherein like reference numerals designate like or similar parts throughout the several views there is illustrated in FIG. 3 a cross-sectional diagram of parts of a data storage disk drive system 30 including a rigid magnetic disk drive unit generally designated as 32 and a control unit generally designated as 34. While a magnetic disk drive unit is illustrated, it should be understood that other mechanically moving memory configurations may be used. Unit 32 is illustrated in simplified form sufficient for an understanding of the present invention because the utility of the present invention is not limited to the details of a particular drive unit construction. After data storage disk drive system 30 is completely assembled, servo information used to write and read data is written using the disk drive system 30.

Figure 4:
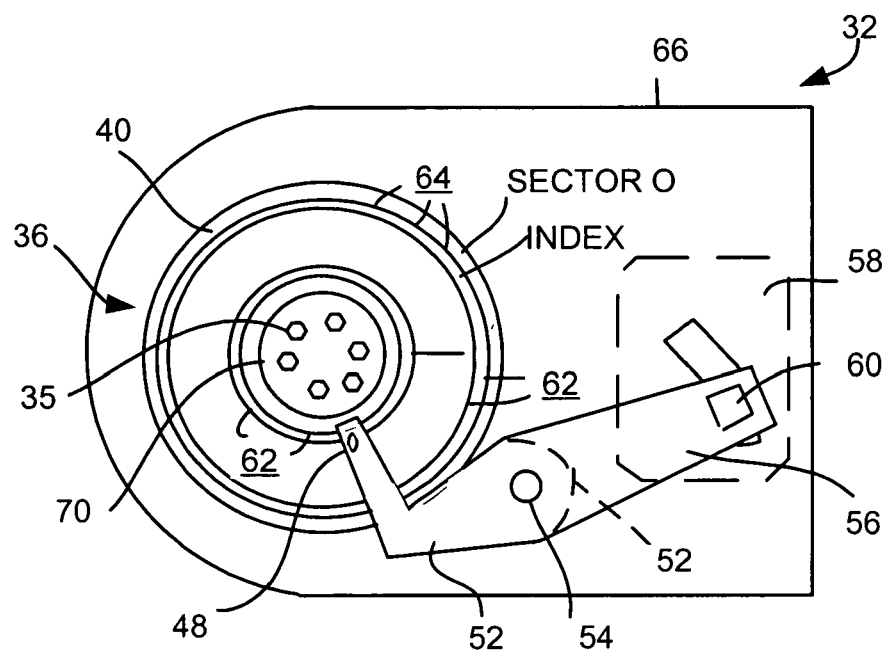
FIG. 4 is a top plan view of the structure shown in FIG. 3.

Referring now to FIGS. 3 and 4 of the drawing, disk drive unit 32 includes a stack 36 of disks 38 having at least one magnetic surface 40. The disks 38 are mounted in parallel for simultaneous rotation on and by an integrated spindle and motor assembly 46. The disks 38 are separated by spacers 33 and are coupled to the spindle at the top by a composite clamp ring 70 which is pressed onto the stack of disks 38 by bolts 35.

Data information on each disk 38 are read and/or written to by a corresponding transducer head 48 movable across the disk surface 40. In a disk drive using a dedicated or hybrid servo, one of the disk surfaces 40' stores servo information used to locate information and data on the other disk surfaces 40.

Transducer heads 48 are mounted on flexure springs 50 carried by arms 52 ganged together for simultaneous pivotal movement about a support spindle 54. One of the arms 52 includes an extension 56 driven in a pivotal motion by a head drive motor 58. Although several drive arrangements are commonly used, the motor 58 can include a voice coil motor 60 cooperating with a magnet and core assembly (not seen) operatively controlled for moving the transducer heads 48 in synchronism in a radial direction in order to position the heads in registration with data information tracks or data cylinders 62 to be followed and access particular data sectors 64. Although a rotary actuator is shown, it should be understood that a disk drive with a linear actuator can be used. Data storage disk drive system 30 is a modular unit including a housing 66. The various components of the disk drive system 30 are controlled in operation by signals generated by control unit 34 such as motor control signals on line 46A and position control signals on line 58A.

Numerous data information tracks 62 are arrayed in a concentric pattern in the magnetic medium of each disk surface 40 of data disks 38. A data cylinder includes a set of corresponding data information tracks 62 for the data surfaces 40 in the data storage disk drive system 30. Data information tracks 62 include a plurality of segments or data sectors 64 each for containing a predefined size of individual groups of data records which are saved for later retrieval and updates. The data information tracks 62 are disposed at predetermined positions relative to servo information, such as a servo reference index. In FIG. 4 one sector 64 is illustrated as SECTOR 0 with a fixed index or mark INDEX for properly locating the first data sector. The location of each next sector 64 is identified by a sector identification (SID) pulse read by transducer heads 48 from surfaces 40, 40'.

Figure 5:
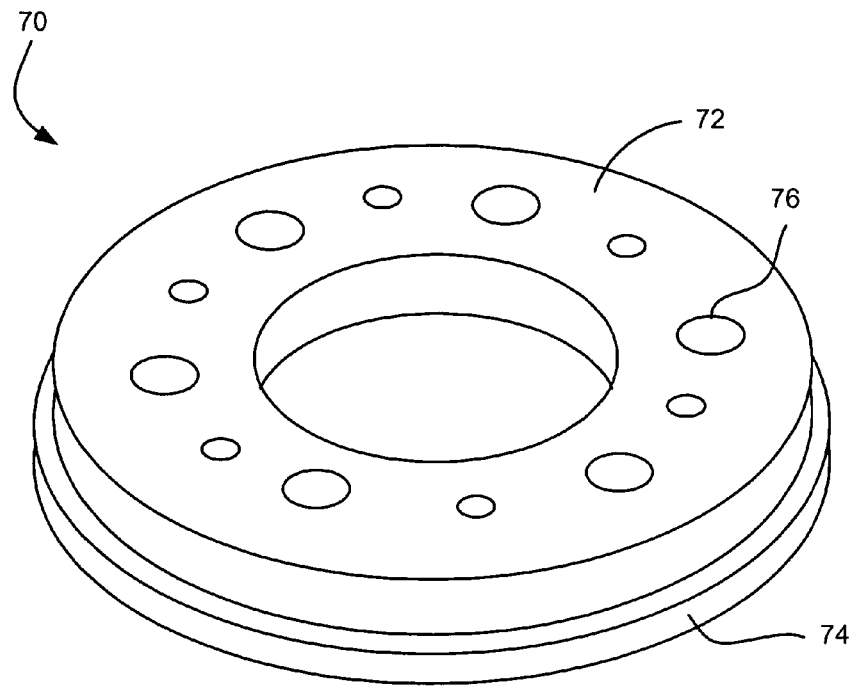
FIG. 5 is a perspective view of a composite spacer according to one embodiment.

FIG. 5 illustrates a composite top clamp ring 70 according to one embodiment. The composite ring 70 includes a stiff annular upper layer 72 that provides rigidity to the clamping structure 70 by providing a more even distribution of stresses on the disks below from the clamping bolts coupled to the composite ring 70 through the apertures 76, which in turn reduces deformation of the disk(s). An annular lower layer 74 is fixedly coupled to the upper layer 72. The lower layer 74 may be of secondary stiffness and is preferably made of a material similar to the disk, e.g., aluminum or ceramic. The highly rigid upper layer 72 of the composite ring 70 reduces deformation caused by the clamping stresses, yet the composite ring 70 provides high mechanical stability due to integral material matching for the clamping interface. The material-matching at the ring-disk interface allows the lower layer 74 and the disk to expand and contract together under temperature variations. (Using a hard material for the lower layer 74 would cause the bottom layer to expand out of phase with the disk.)

The upper layer 72 of the composite ring is preferably made of a material with a high hardness and high modulus so that it is less susceptible to bending and/or cracking under the stress of the clamping forces. Preferably, the upper layer 72 has a material hardness and/or modulus that is at least as hard as the disk itself. Thus, if an aluminum disk is used in the drive, the stiffening layer should have a hardness at least about the same as the aluminum material used to form the disk. Illustrative materials from which the upper layer 72 can be formed are nickel, titanium, chrome, stainless steel, materials treated (e.g., doped) for stiffness and hardness, silicon nitride, aluminum nitride, alloys, composites, etc.

The lower layer 74 is preferably constructed of a material which is of a similar or about the same coefficient of thermal expansion as that of the primary material of the disk, i.e., disk substrate of glass, aluminum, etc. The thermal conductivity parameter shown in Table 1 (below) is important but to a lesser extent than the coefficient of thermal expansion and the Young's modulus of the material. The thermal conductivity should be similar to the disk since heat from the motor does not build up in the lower layer 74 but can transmit to the disk uniformly.

The following table lists several materials from which the composite ring 70 can be constructed, and their properties. Note that the modulus is a measure of the load a material can handle before it starts to deform.

TABLE 1

| Material | Hardness (kg/mm$^2$) | Modulus (GPa) | Thermal Conductivity (W/m-K) | Coefficient of Thermal Expansion (10$^{-6}$/C.) |
|---|---|---|---|---|
| Aluminum | 27 | 70 | 221 | 25 |
| Chrome | 125 | 26 | 14 | 6 |
| Titanium | 65 | 110 | 2 | 8.5 |
| Nickel | 210 | 200 | 60 | 13 |
| Glass | 185 | 63 | 1 | 4 |
| Stainless Steel | 160 | 205 | 16 | 12 |

An illustrative range of materials usable in the composite ring 70 have a hardness of about 20 to about 250 kg/mm$^2$, a modulus of about 60 to about 300 GPa and a thermal expansion between 1 and 25 (10$^{-6}$/C). Note that glass and aluminum have a similar Young's modulus, but the aluminum has about 6 times the coefficient of thermal expansion as glass. Therefore, an aluminum spacer is preferred for use with aluminum disks, while a ceramic spacer is preferred for use with glass disks.

The following table illustrates exemplary Young's modulus ratios for the upper and lower layers of the composite ring 70. The modulus ratio is important as a measure of how well the composite ring 70 will provide the desired properties.

TABLE 2

| Material Combination | Modulus Ratio of Two Materials: first ÷ second layer |
|---|---|
| Stainless Steel Clamp with Aluminum spacer | 205/70 = 3.0 |
| Stainless Steel Clamp with Glass spacer | 205/63 = 3.3 |
| Titanium Clamp with Aluminum spacer | 110/70 = 1.6 |
| Titanium Clamp with Glass spacer | 110/63 = 1.8 |

A preferred modulus ratio range can be shown by the following: 1.0<Modulus Ratio<5.0. However, this range may not be all inclusive and would allow some combinations outside of this range, especially using nonmetallic disks and clamps, i.e. plastic and silicon disks with plastic and silicon lower layers 74. When glass disks are used, an illustrative modulus ratio of about 3.3 is provided by a stainless steel upper layer 72 and a ceramic lower layer.

A middle layer of the composite ring, positioned between the upper and lower layers 72, 74, can be added to achieve the desired overall modulus ratio. The middle layer can be constructed of another material such as one or more of stainless steel, chrome, nickel, etc. and composites and alloys thereof.

The layers of the composite ring 70 can be coupled together using any suitable process. Several techniques to perform such bonding are described below. Three particular techniques include mechanical bonding, adhesive chemical bonding, and bonding at the molecular level.

Mechanical bonding of the layers can be achieved by protrusions and corresponding receiving areas such as ridges/textured lines and coincident troughs. The mechanical coupling encourages the various layers to expand and contract together, thereby maintaining the proper alignment.

Figure 6A:
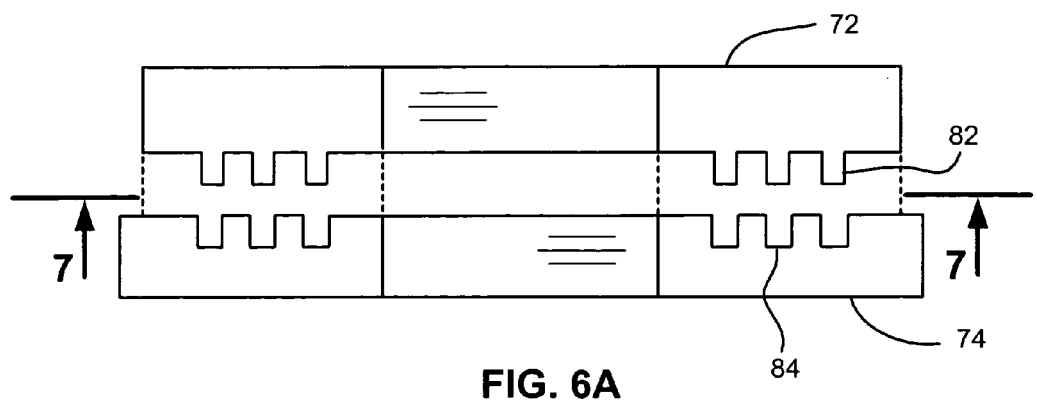
FIG. 6A is an exaggerated cross-sectional view of a composite ring with upper and lower layers coupled together via a series of ridges and troughs.
Figure 7:
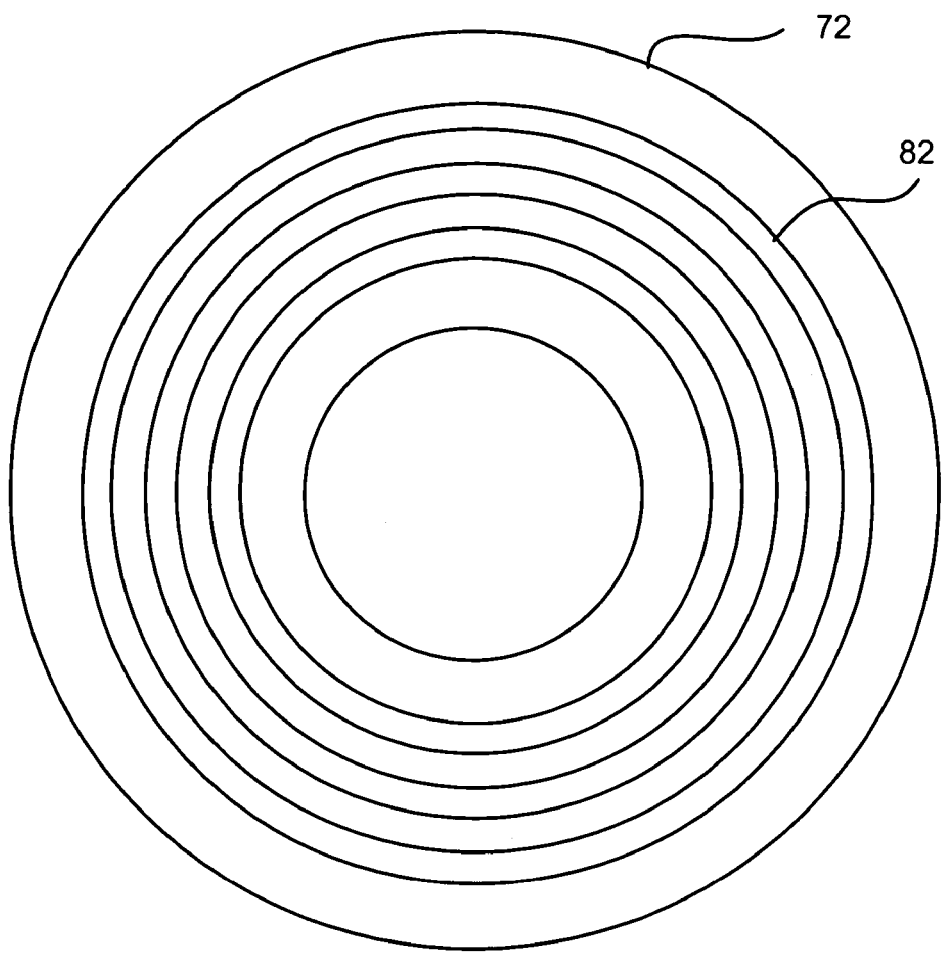
FIG. 7 is a side view of the first layer of FIG. 6A taken along lines 7-7 of FIG. 6A.

FIG. 6A is an exaggerated view of the composite ring 70 with the upper and lower layers 72, 74 coupled together via a series of ridges 82 and troughs 84. FIG. 7 shows the ridge structure on the bottom of the upper layer 72 which mates with a trough structure on the lower layer 74 to create the composite ring. The ridges 82 mate into the troughs 84, providing mechanical bonding and strength between the layers. With this type of mating for the composite ring 70, high structural integrity and superior bonding is maintained for a system that is exposed to the high stress of clamping a multi-disk pack.

Figure 6B:
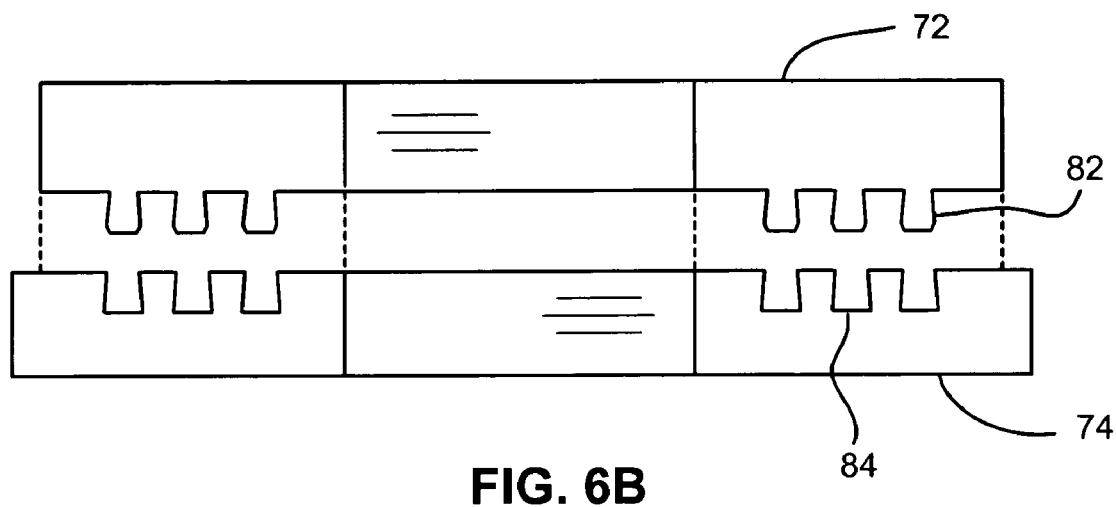
FIG. 6B is an exaggerated cross-sectional view of a composite ring with upper and lower layers coupled together via a series of dovetail protrusions and receiving areas.
Figure 6C:
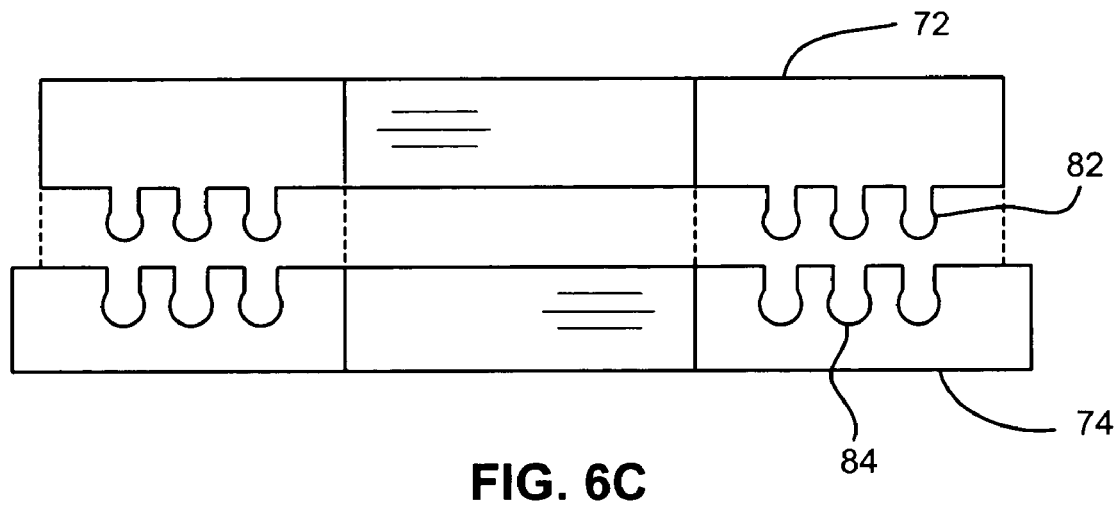
FIG. 6C is an exaggerated cross-sectional view of a composite ring with upper and lower layers coupled together via a series of bulbous protrusions and receiving areas.

Other variations to create the mechanical coupling can include random or nonrandom fingerlike perturbations and recesses, teeth (see FIG. 9), etc. To enhance the coupling, "dovetail" protrusions, bulbous protrusions, etc. can be used to form semi-permanent or permanent coupling. Note FIGS. 6B and 6C.

Chemical bonding can also be used individually, or in combination with protrusions/receiving portions as described in the immediately preceding paragraphs. Adhesives such as silicon-based adhesives can be used to create the chemical bond. In a similar manner, bonding at the molecular level can be achieved by sintering, welding, ultrasonic welding, etc.

Because the two layers 72, 74 are coupled together, a processing step during drive assembly is saved in that only one piece (clamp-spacer composite) need be handled instead of two parts (clamp and spacer). Additional cost savings are realized during manufacture of the annular layers 72, 74 themselves, as it is longer necessary to machine two surfaces to obtain a hardness match.

Figure 8:
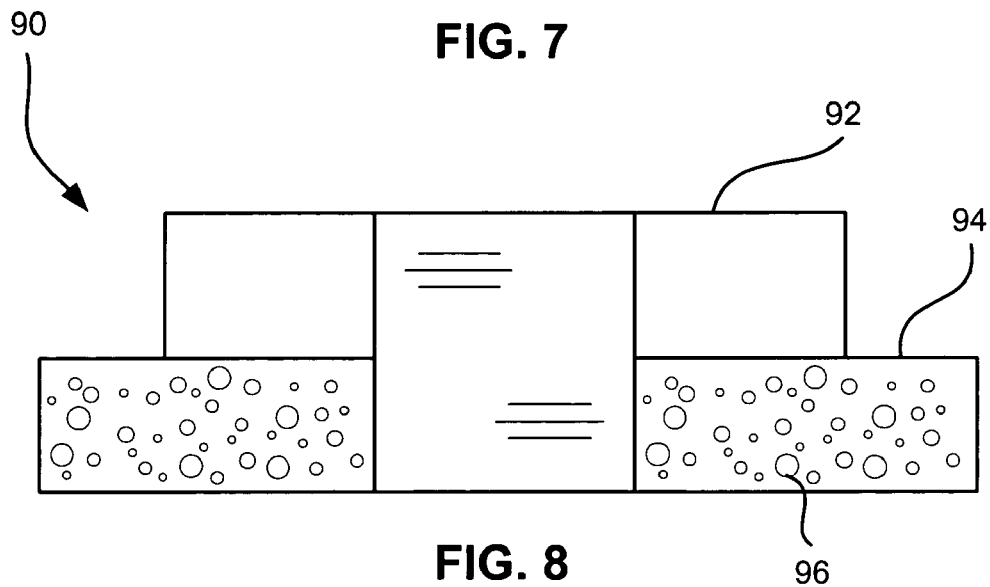
FIG. 8 is a cross-sectional view of a clamp/spacer ring assembly according to one embodiment.

A clamp/spacer ring assembly according to another embodiment is constructed at least in part of plastic. Such a ring assembly 90, particularly suitable for use in a drive having disks themselves constructed at least in part of a plastic material, is shown in FIG. 8. The ring assembly 90 according to one embodiment includes a stiff annular clamp 92, followed by an annular plastic spacer ring 94. The clamp 92 is preferably constructed of materials described above with respect to the first layer of the composite ring. The spacer ring 94 is preferably constructed of any plastic material having properties similar to that of the plastic in the disks, and may be formed or molded as a single layer, a composite structure, etc. Illustrative plastic materials include polyolefins, polyethylenes, polycarbonates, polystyrenes, polyvinyl chlorides, polymers, resins, etc. In the embodiment shown in FIG. 8, the spacer ring 94 has glass beads 96 (or other material strengthening elements) of any shape embedded into the plastic matrix in a non-uniform manner. Preferably, the material strengthening elements are harder than the material from which the spacer ring 94 is constructed. This allows a gradient of density from high to low (high closest to the clamp 92) which will allow a gradient of thermal expansion to be made more uniform from the stiff clamp 92 to the lower portion of the plastic spacer ring 94. Without this gradient the clamp 92/spacer ring 94 combination would suffer from thermal expansion properties as well as modulus problems. The plastic lower layer closest to the clamp 92 would have a high density of materials, allowing for a thermal expansion and modulus closest to the clamp 92. The portion of the plastic ring closest to the plastic disk would then have material properties very similar to that of the plastic disk being clamped. Preferably, some type of mechanical mating (e.g., see FIGS. 9 and 10) is implemented to integrally couple the layers to prevent slipping of the layers, particularly where dissimilar materials are used.

Figure 9:
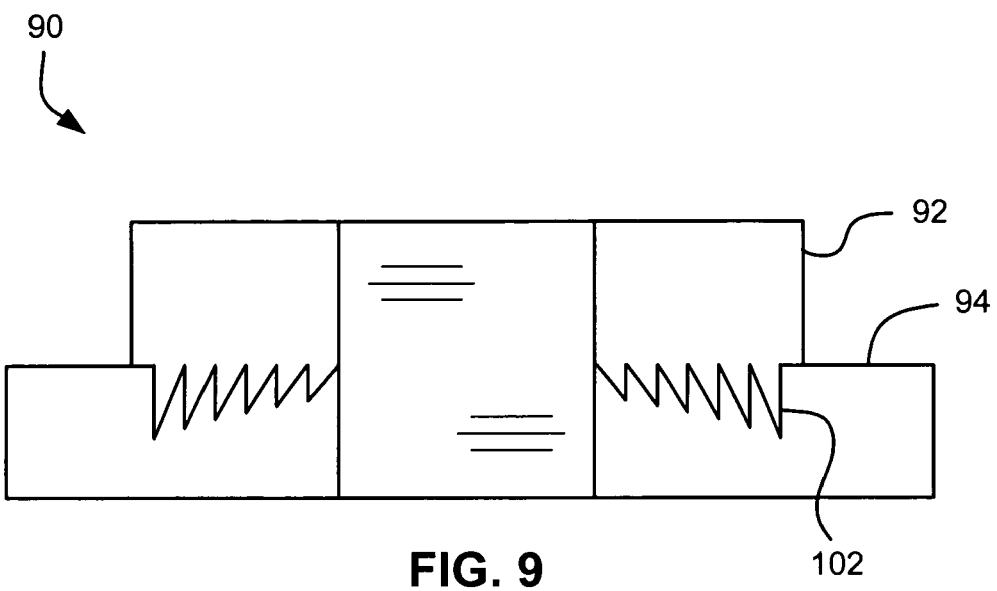
FIG. 9 is a cross-sectional view of a clamp/spacer ring assembly according to another embodiment.

Another way to obtain a non-uniform plastic structure is with teeth 102, as shown in FIG. 9. The teeth 102 are preferably extensions from the clamp 92 which extend into the plastic matrix. The teeth 102 may be annularly aligned, segmented, randomly placed, etc. This will increase the density and modulus of the plastic structure and will give it similar material properties as explained in the previous paragraph. Note also that the teeth 102 and ridges 104 may also extend from the plastic ring 94 into the clamp 92.

Figure 10:
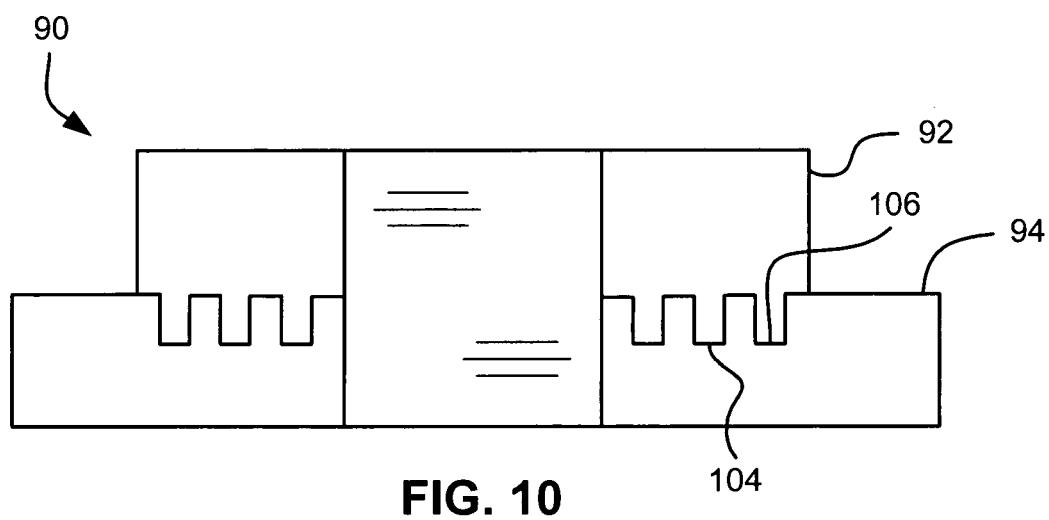
FIG. 10 is a cross-sectional view of a clamp/spacer ring assembly according to yet another embodiment.

Yet another way to obtain a non-uniform plastic structure is with a ridge/trough 104, 106 combination, as shown in FIG. 10. The teeth 104 are preferably extensions from the clamp 92 which extend into the plastic matrix. The ridges 104 may be annularly aligned, segmented, randomly placed, etc. This will increase the density and modulus of the plastic structure and will give it similar material properties as explained in the previous paragraphs. Note also that the ridges 104 may also extend from the plastic ring into the clamp 92.

The clamp 92 and plastic spacer ring 94 of the ring assemblies shown in FIGS. 8-10 can be installed individually in the disk drive. The mechanical coupling causes the layers to expand and contract together in a uniform fashion, thereby preventing the disk from going off-center. Alternatively, the clamp 92 and plastic spacer ring 94 can be fixedly coupled together to form a composite structure similar to that described above with respect to FIG. 5.

Thus, the composite structure described herein will reduce the parts count and the cost associated with an individual clamp 92 and spacer ring 94. The composite material choices will also allow better thermal expansion, stiffness and modulus which is mated and matched perfectly to the top disk of the stack. Under torquing requirements the stress is spread out evenly over the top disk so as to minimize tangential and radial curvature effects.

Composite structures that have a blend of coupling morphologies are also to be considered as a composite structure that are mechanically bonded to one another. The set of mechanical couplings indicated in the individual FIGS. 6A, 6B and 6C can be blended into one as a combination, i.e. A+B, A+C, B+C. Also, for the plastic clamp/ring structure shown in FIGS. 9 and 10, these can also be combined, i.e. 9+10.

Another embodiment of the present invention includes clamps and spacers where the clamps and spacers are clamped directly to the disk. The embodiments described below result in reduced potato chipping as the force exerted by the clamp and spacer(s) on the disk is distributed more evenly across the disk surface. A further advantage is that the potential of slippage of the disk with respect to a clamp and spacer is dramatically reduced so as to be substantially non-existent, due to the mating engagement. One skilled in the art will also understand that the teachings of the clamp and spacer combinations described above can be adapted to create variations on the embodiments described below.

In one embodiment, the clamps and/or spacers "bite" into the disk surface. By biting into the disk surface, what is meant is that protrusions extending from the clamp and/or spacer engages and deforms the surface of the disk. If the disk is plastic or metal, the disk can be heated to aid in deformation.

Figure 11:
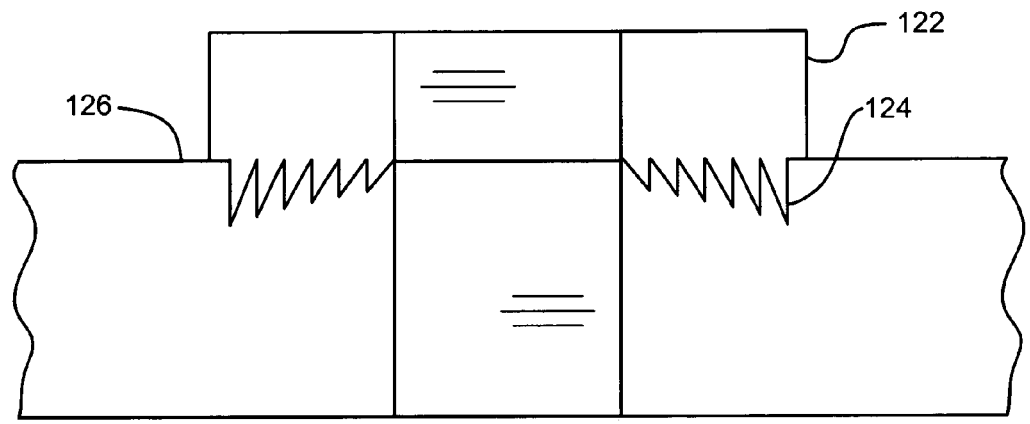
FIG. 11 is a cross-sectional view of a clamp with teeth (or other protrusions) that bite into the surface of a disk.

FIG. 11 illustrates an embodiment in which a clamp 122 has teeth 124 (or other protrusions) that bite into the surface of a disk 126. In this embodiment, the clamp is formed of a hard material, i.e., harder than the portion of the disk to which the clamp engages the disk. For example, the clamp can be formed of metal while the portion of the disk engaging the clamp can be plastic that deforms upon bolting the clamp to the disk. This configuration provides the advantage that a single bolt can be inserted through a central opening of the clamp and disk to affix the clamp and disk to the motor, thereby further reducing the time and cost of manufacture. Prior art configurations use large bore screws to provide adequate force to prevent disk slippage. Here, the teeth will prevent slippage by mechanical bonding. However, the conventional configuration of multiple bolts/screws can also be used to attach the clamp and disk to the motor.

Figure 12:
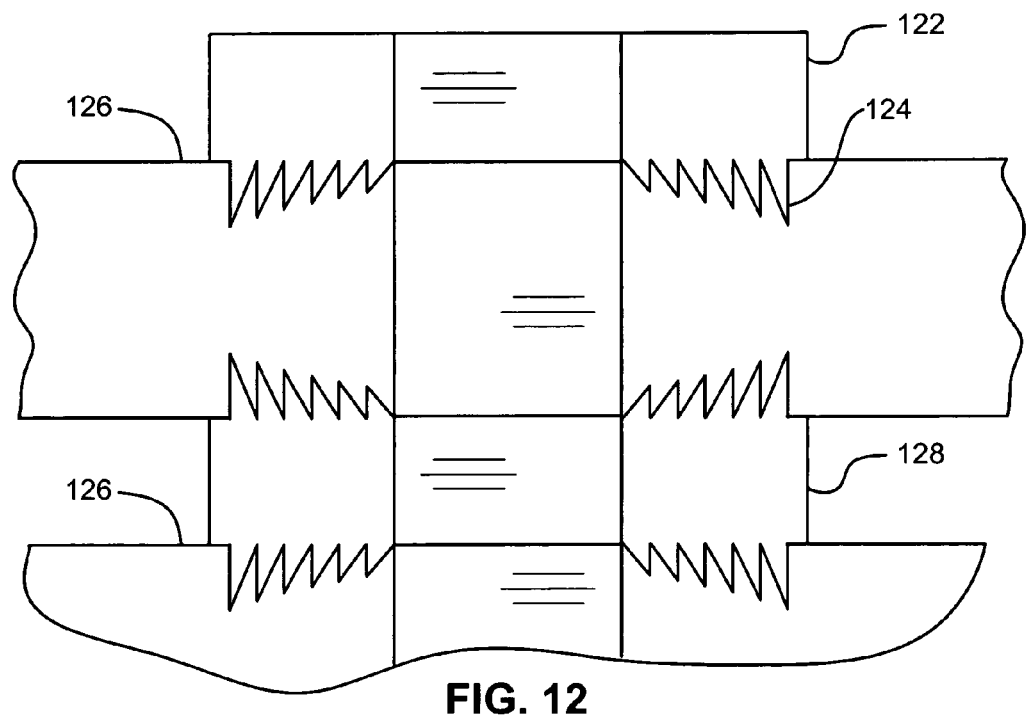
FIG. 12 is a cross-sectional view depicting addition of a spacer to the clamp and disk assembly of FIG. 11.

FIG. 12 depicts the embodiment of FIG. 11, with a spacer 128 separating the upper disk from a lower disk. In the structure shown, the spacer has teeth on both sides thereof. The teeth of the spacer engage the disks, forming mechanical couplings therewith in a manner similar to the way the clamp couples to the upper disk.

In a variation, the clamp and/or spacer may have recessed regions, such as dimples or channels, in the disk-engaging surface thereof that allow the surface of the disk to deform into the recessed regions upon compression. If the disk is plastic or metal, the disk can be heated to aid in deformation.

In another embodiment, the clamp and/or spacer engages protrusions and/or receiving areas (e.g., teeth, nubs, etc. and complementary grooves, channels, dimples, holes, etc.) preformed on the disk. Thus, the clamp and spacer can have protrusions, recesses, or both. Likewise, the disk can have complementary protrusions, recesses, or both. For example, the disk can be formed with recesses that receive protrusions from the clamp and/or spacer in a similar manner as the spacer/clamp assemblies described in FIGS. 6A-C, 9 and 10 and related discussion. If the disk is plastic, recesses can be molded in the disk. If the disk is alumina, recesses can be machined into the disk. If the disk is glass, recesses in the disk can be formed by etching.

In any of these embodiments, the clamp and/or spacer can be a multi-layer (composite) structure having a soft engaging layer that receives protrusions extending from the disk. In such an embodiment, at least one layer of the clamp would be stiff to resist deformation upon attachment to the spindle. The spacer may or may not include a stiff layer.

To enhance the mechanical coupling of the clamp/spacer to the disk, an adhesive can be added.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A clamp for coupling a disk to a spindle, comprising:
a clamp for engaging a magnetic disk, wherein the clamp has non-randomly formed protrusions that bite into a surface of the disk at least beyond an overall plane of the surface being bitten into, the protrusions having a substantially similar shape when engaging the disk and when not engaging the disk, wherein the protrusions have a shape characterized by at least one of tapering apart towards free ends thereof, tapering to a point, and having a generally rectangular cross section.

2. A clamp as recited in claim 1, wherein the protrusions are organized in a generally annular fashion.

3. A clamp as recited in claim 1, wherein the protrusions have a greater stiffness than a primary material of the disk into which the protrusions bite.

4. A clamp as recited in claim 3, wherein the protrusions deform the surface of the disk being bitten into.

5. A clamp as recited in claim 1, wherein the clamp has a stiffness at least as stiff as a primary material of the disk.

6. A clamp as recited in claim 1, wherein the clamp is a composite structure comprising at least two layers, each of differing materials.

7. A clamp as recited in claim 1, further comprising a spacer, wherein the spacer has protrusions adapted to bite into a surface of the disk.

8. A magnetic storage system, comprising:
the disk and clamp assembly of claim 1;
at least one head for reading from and writing to the disk, each head having:
a sensor;
a write element coupled to the sensor;
a slider for supporting the head; and
a control unit coupled to the head for controlling operation of the head.

9. A clamp, comprising:
a clamp for engaging a magnetic disk, wherein the clamp has non-randomly formed protrusions that bite into a surface of the disk at least beyond an overall plane of the surface being bitten into, the protrusions having a substantially similar shape when engaging the disk and when not engaging the disk
wherein the protrusions have bulbous portions towards free ends thereof.

10. A disk and clamp assembly, comprising:
a magnetic disk having receiving areas pre-formed therein, wherein the receiving areas do not extend through the magnetic disk; and
a clamp engaging the disk, wherein the clamp has pre-formed protrusions that engage the receiving areas, the protrusions having a shape that is complementary to the receiving areas,
wherein the clamp is a composite structure comprising at least two layers, each of differing materials,
wherein the layer of the clamp engaging the disk has about a same stiffness as a primary material of the disk,
wherein another of the layers has a stiffness harder than the layer of the clamp engaging the disk.

11. An assembly as recited in claim 10, wherein the protrusions are organized in a generally annular fashion.

12. An assembly as recited in claim 10, wherein the protrusions taper to a point.

13. An assembly as recited in claim 10, wherein the protrusions have a generally rectangular cross section.

14. An assembly as recited in claim 10, wherein the protrusions taper apart towards free ends thereof.

15. An assembly as recited in claim 10, wherein an adhesive is positioned in the receiving areas.

16. An assembly as recited in claim 10, wherein the clamp has a stiffness at least as stiff as a primary material of the disk.

17. An assembly as recited in claim 10, wherein the protrusions have bulbous portions towards free ends thereof.

18. An assembly as recited in claim 10, further comprising a spacer, wherein the spacer has protrusions that engage receiving areas of the disk.

19. A magnetic storage system, comprising:
the disk and clamp assembly of claim 10;
at least one head for reading from and writing to the disk, each head having:
a sensor;
a write element coupled to the sensor;
a slider for supporting the head; and
a control unit coupled to the head for controlling operation of the head.

20. An assembly, comprising:
a magnetic disk having receiving areas pre-formed therein, wherein the receiving areas do not extend through the magnetic disk; and
a clamp engaging the disk, wherein the clamp has pre-formed protrusions that engage the receiving areas, the protrusions having a shape that is complementary to the receiving areas,
wherein the protrusions have bulbous portions towards free ends thereof.

21. A disk and clamp assembly, comprising:
a magnetic disk; and
a clamp engaging the disk,
wherein the clamp has non-randomly formed protrusions that bite into a surface of the disk at least beyond an overall plane of the surface being bitten into, the protrusions having a substantially similar shape when engaging the disk and when not engaging the disk,
wherein the protrusions have a shape characterized by at least one of tapering apart towards free ends thereof, tapering to a point, and having a generally rectangular cross section.

* * * * *

UNITED STATES PATENT AND TRADEMARK OFFICE
CERTIFICATE OF CORRECTION

| | | |
|---|---|---|
| PATENT NO. | : 7,446,973 B2 | Page 1 of 1 |
| APPLICATION NO. | : 10/741232 | |
| DATED | : November 4, 2008 | |
| INVENTOR(S) | : Feliss et al. | |

It is certified that error appears in the above-identified patent and that said Letters Patent is hereby corrected as shown below:

Col. 4, lines 37-38 change "SECTOR 0" to --SECTOR O--.

Signed and Sealed this

Sixth Day of January, 2009

JON W. DUDAS
*Director of the United States Patent and Trademark Office*